US005492046A

United States Patent [19]

Jimenez

[11] Patent Number: 5,492,046

[45] Date of Patent: Feb. 20, 1996

[54] FINGER-MOUNTED, ROTATABLE SLIDE FOR A STRINGED MUSICAL INSTRUMENT

[76] Inventor: Raul M. Jimenez, 3354 E. Imperial Hwy., Lynwood, Calif. 90262

[21] Appl. No.: 391,225

[22] Filed: Feb. 21, 1995

[51] Int. Cl.$^6$ .................. G01D 3/00

[52] U.S. Cl. .................. 84/319

[58] Field of Search .................. 84/315, 316, 317, 84/319

[56] References Cited

U.S. PATENT DOCUMENTS 2,021,641 11/1935 Spina .................. 84/319

3,457,822 11/1965 Mull .................. 84/319

*Primary Examiner*—Patrick J. Stanzione

*Attorney, Agent, or Firm*—Gene W. Arant

[57] ABSTRACT

A finger-mounted, rotatable slide for a stringed musical instrument includes a finger ring adapted to be received on one of the player's fingers, a rigid rail attached to a point on the circumference of the ring and extending from the ring in a direction perpendicular to the plane of the ring, and a finger tab provided on the rail. One longitudinal edge of the rail is straight, for engaging the strings, and the finger tab is on the other longitudinal edge of the rail. The player of the instrument mounts the ring on a finger, and applies an adjacent finger to the tab to selectively rotate the ring so as to either engage the straight edge of the rail with the strings, or disengage the rail from the strings.

6 Claims, 4 Drawing Sheets

VIEW OF SLIDE
FROM PALM

VIEW OF SLIDE
FROM BACK HAND

VIEW OF SLIDE
FROM PALM

USE OF SLIDE FROM
VARIOUS PERSPECTIVES.

NOTE:
HOW LITTLE FINGER USES
TAB OF SLIDE TO APPLY
PRESSURE AGAINST
GUITAR STRINGS.

THE ABOVE DIAGRAMS SHOW FREEDOM OF FINGER MOVEMENT WHILE USING THE SLIDE.

FINGER-MOUNTED, ROTATABLE SLIDE FOR A STRINGED MUSICAL INSTRUMENT

RELATED APPLICATION

The invention disclosed and claimed herein has been previously disclosed in my copending application for design patent entitled SLIDE GUIDE FOR GUITAR, Ser. No. 29/027,394, filed Aug. 22, 1994.

BACKGROUND OF THE INVENTION

The use of slides with stringed musical instruments has long been known. Generally speaking, the slide has one straight edge that is long enough to bridge a number of strings of the instrument at one time. By using the slide, the person playing the instrument can depress a number of strings at the same time, and thereby shorten the length of the strings, change their vibration frequency, and hence change the musical character of the instrument. But the slide is used only on an interim basis, and when it is not being used the instrument has its original musical character.

One feature of all the many slides with which I have been familiar is that the player loses the use of one or more fingers while applying the slide to the strings. Thus, if the player is plucking the strings, as with the guitar, the loss of finger availability restricts the musical performance that can be rendered.

SUMMARY OF THE INVENTION

According to the present invention the slide includes a finger ring that is received on one of the player's fingers, a rigid rail attached to a point on the circumference of the ring and extending from the ring in a direction perpendicular to the plane of the ring, and a finger tab provided on the rail.

The player then applies an adjacent finger to the finger tab to selectively rotate the position of the ring on his finger, so as to either engage the straight edge of the rail with the strings or disengage the rail from the strings.

An advantage of the invention is that the use of the slide involves a minimal interference with the ability of the player to use his fingers for plucking the strings of the instrument.

Thus the object of the invention is to provide a slide for use with a stringed musical instrument that is of simple construction, easy to use, and allows the player full use of the fingers for playing the instrument.

DRAWING SUMMARY

Figure 11:
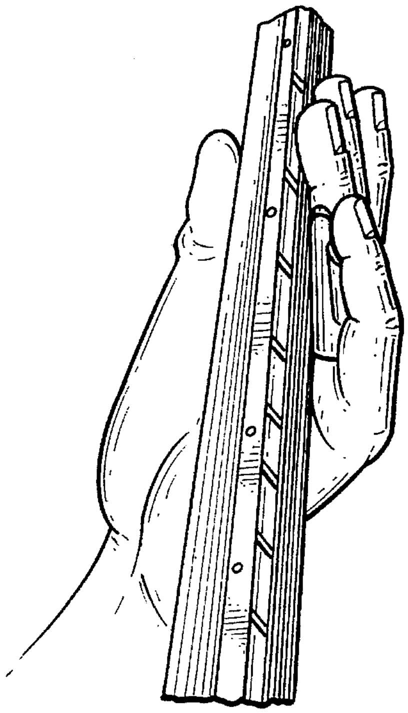
Figure 12:
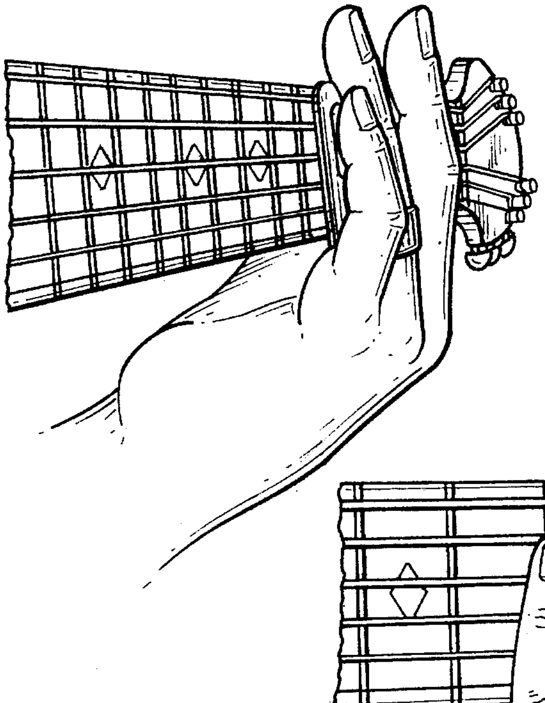
Figure 13:
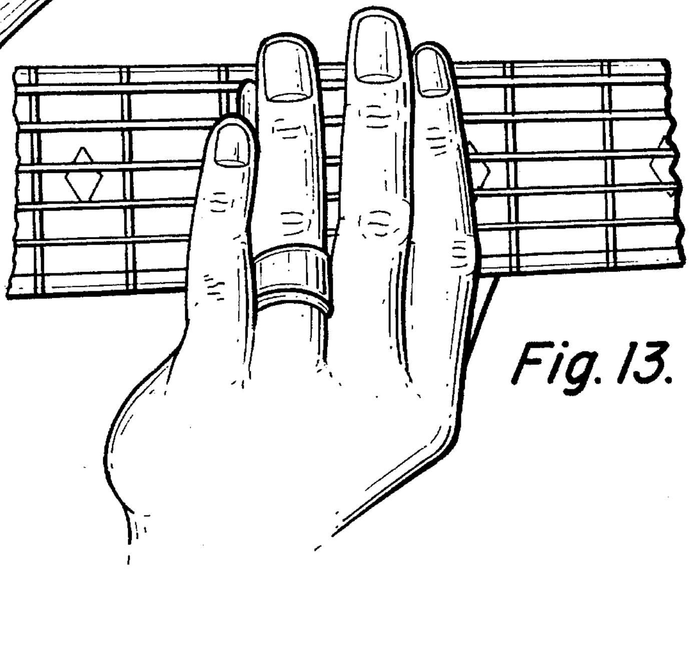
Figure 14:
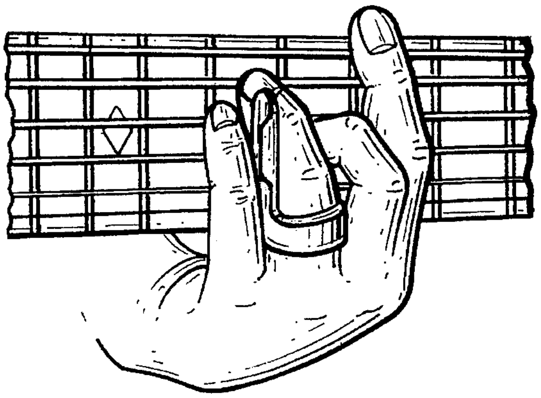
Figure 15:
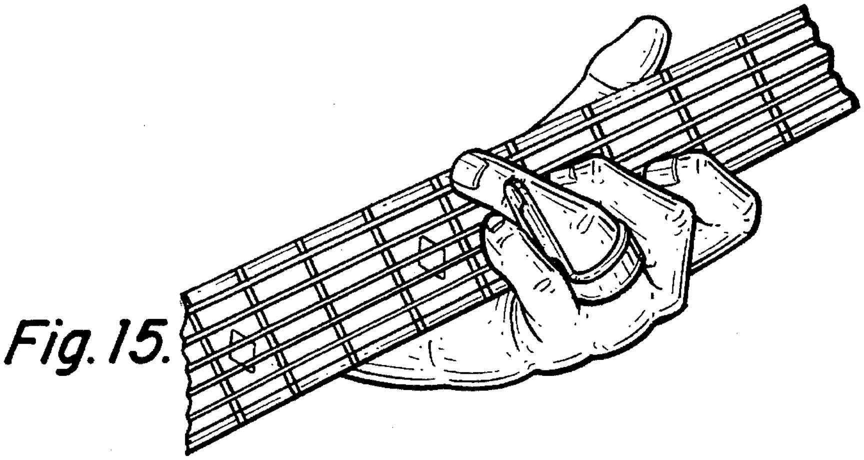
Figure 16:
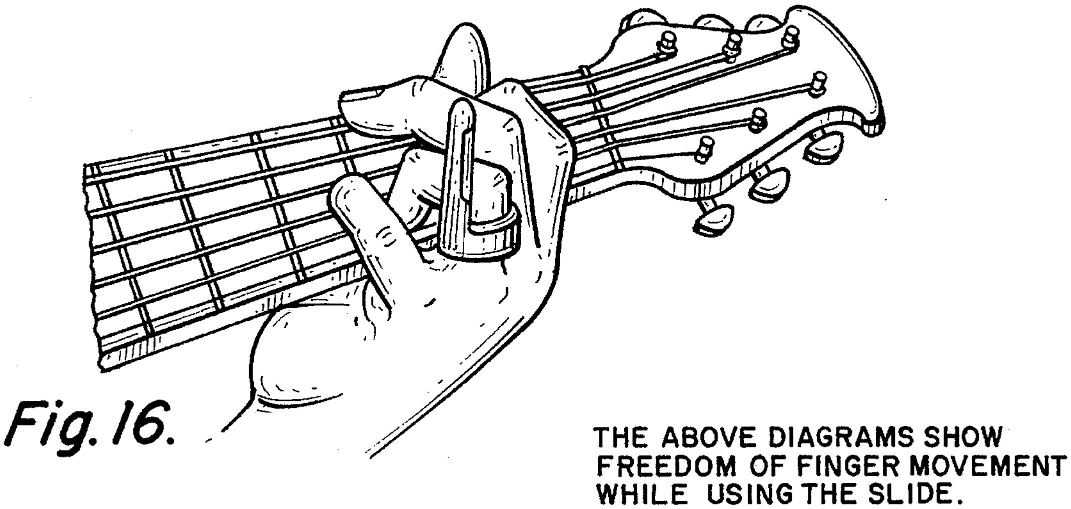

FIGS. 11, 12, and 13 are perspective views of my slide in use on a guitar, showing from three different points of view the action of the player's little finger in using the tab of the slide to apply pressure against the guitar strings; and FIGS. 14, 15, and 16 are perspective views of my slide, after the tab of the slide has been used to partially rotate the slide so that it does not interfere with the fingers, showing from three different points of view the action of the player's fingers, including the finger on which the slide is mounted, in playing the guitar strings.

DETAILED DESCRIPTION OF PREFERRED EMBODIMENT

(FIGS. 1–7 and 9–16)

Referring now to the drawings, the slide 10 includes a finger ring 20, and a rigid rail 30 having one end 31 fixedly attached to the circumference of ring 20 and extending therefrom in a direction substantially perpendicular to the plane of the ring. The other end 32 of the rail 30 is rounded. The rail 30 has one longitudinal edge 34 that is straight, and a finger tab 40 projects from the other longitudinal edge 36 of the rail.

More specifically, according to the presently preferred embodiment of the invention the ring 20 is not continuous, but has a circumferential gap 22 therein. The ring 20 is made of a malleable material so that the player may adjust the width of the gap 22 in order to adjust the circumference of the ring and thereby better fit his or her finger.

Further, according to the preferred embodiment of the invention, the ring 20, rail 30, and tab 40 are integrally formed of a malleable material. Although certain types of material might create or be subject to undesired vibrations that would interfere with the proper musical performance of the instrument, a wide selection of suitable materials is nevertheless available.

The present invention also provides a novel method of operating a slide for a stringed musical instrument, which includes selecting a ring to be received on one finger of a player, selecting a rigid rail having one longitudinal edge that is straight and having a finger tab on its other longitudinal edge, attaching the rigid rail to one point on the circumference of the ring so that the rail extends in a direction perpendicular to the plane of the ring, placing the ring on the player's finger, and then engaging the tab with an adjacent finger so as to rotate the position of the ring on the finger and hence also adjust the rotational position of the rail relative to the finger.

Figure 9:
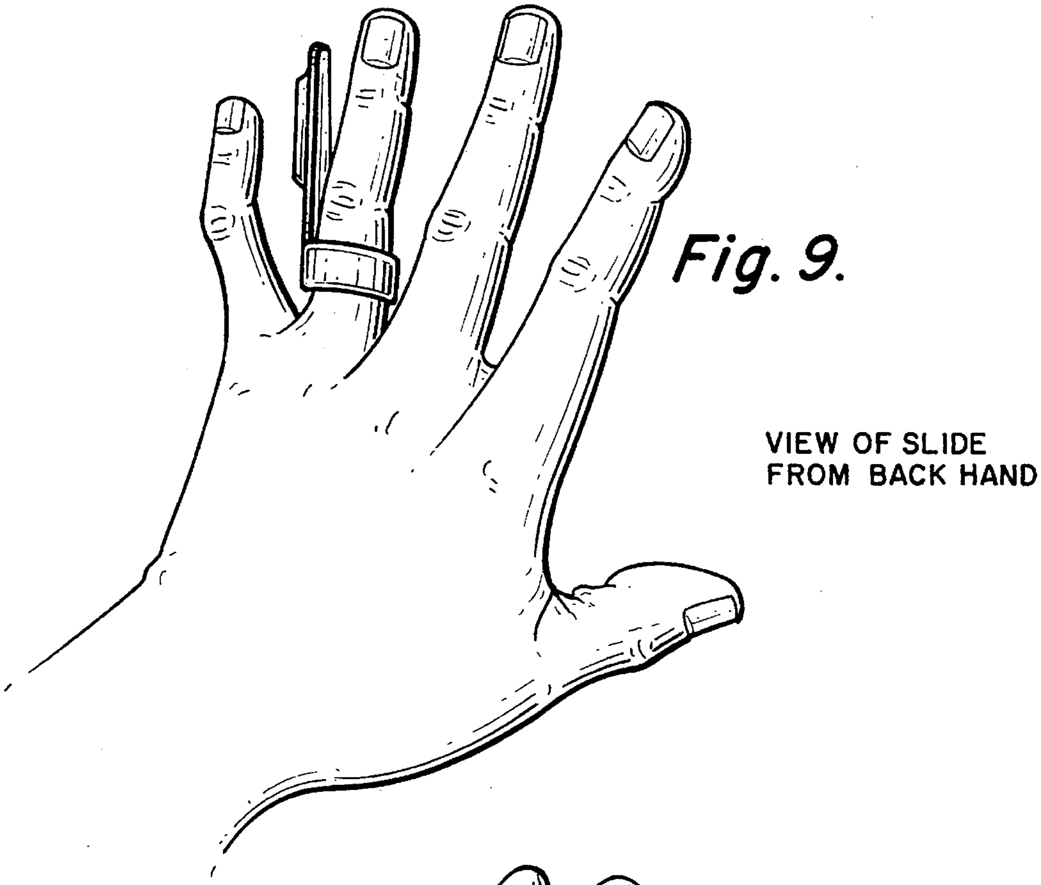
FIG. 9 is a perspective view of my slide when mounted on the finger of a guitar player, taken from the back of the hand.
Figure 10:
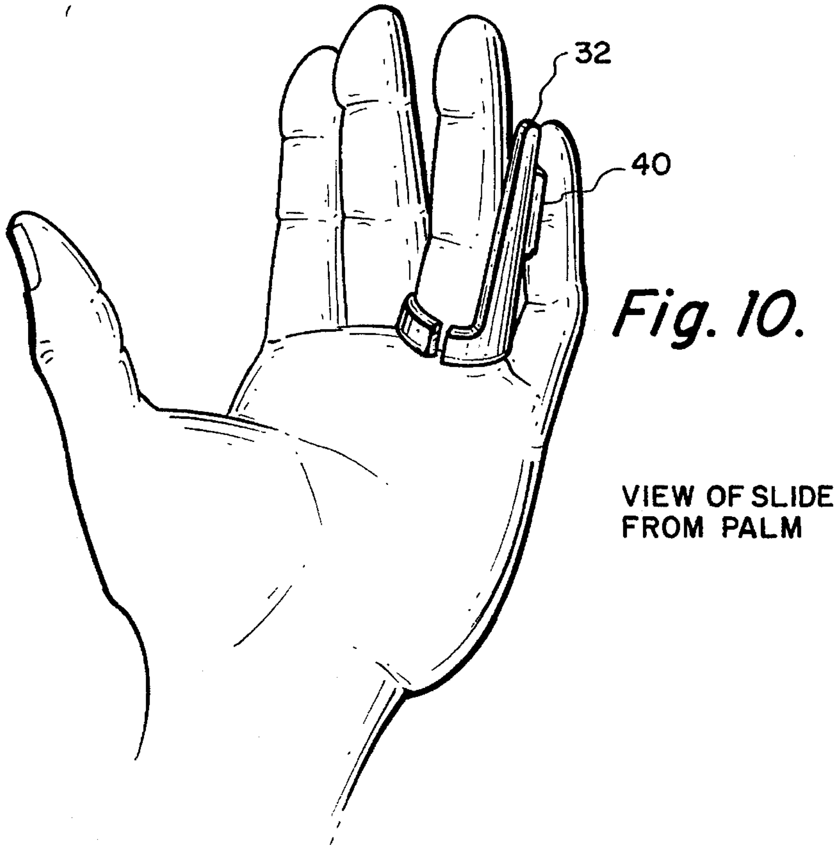
FIG. 10 is a perspective view of my slide when mounted on the finger of a guitar player, taken from the palm of the hand.

Drawing FIGS. 9 through 16 provide perspective views of my novel slide, and also fully illustrate the manner of its use. FIGS. 9 and 10 show the ring 20 of slide 10 mounted on the next-to-smallest finger of a player. The player's little finger is then in position to engage the finger tab 40 for causing the ring to rotate about the finger on which it is mounted. FIGS. 11, 12, and 13 are perspective views of my novel slide in use on a guitar, showing from three different points of view the action of applying the player's little finger to the tab of the slide so that the slide in turn engages the guitar strings. These figures show from three different points of view the action of the player's fingers, including the finger on which the slide is mounted, in playing the guitar strings.

FIGS. 14, 15, and 16 are perspective views of my slide, after the tab of the slide has been used to partially rotate the slide into an idle position where it does not interfere with the use of the fingers for playing the instrument. Thus, the ring 20 does not have to be removed and the slide does not have to be moved to some other location in order to allow the player the full use of his fingers for playing the instrument.

Thus it will be seen that my novel FINGER-MOUNTED, ROTATABLE SLIDE FOR A STRINGED MUSICAL INSTRUMENT provides a simple and convenient way for the player of the stringed instrument to depress multiple strings of the instrument at the same time, and yet he may when desired simply rotate the slide to its idle position without the necessity of removing it from his hand.

ALTERNATE FORM

Figure 1:
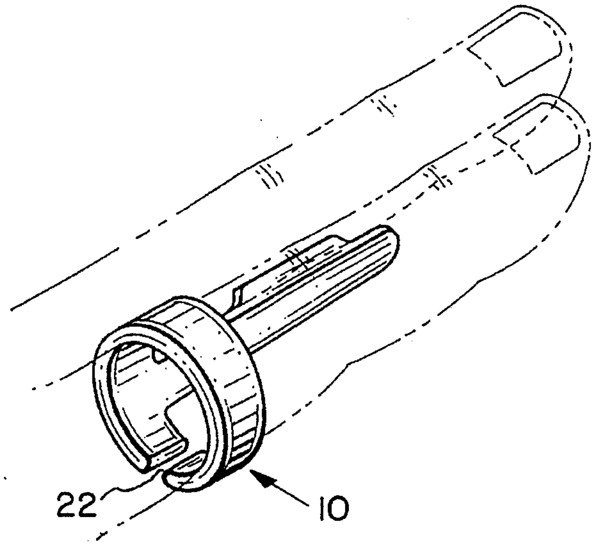
FIG. 1 is an isometric view of my new slide guide.
Figure 8:
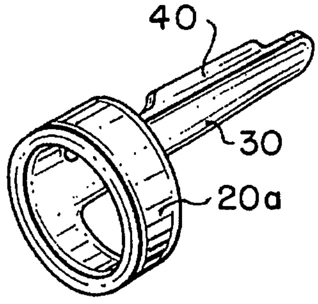
FIG. 8 is an isometric view of an alternate form of my new slide guide.
Figure 2:
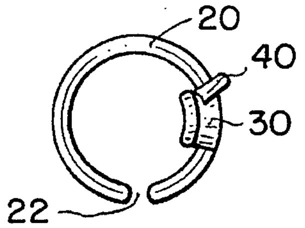
FIG. 2 is a front end view of the guide.
Figure 3:
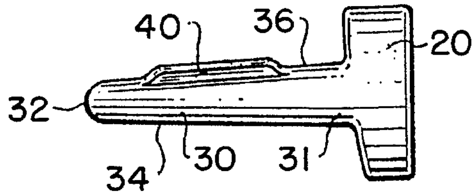
FIG. 3 is a right side view.
Figure 4:
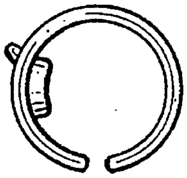
FIG. 4 is a rear end view.
Figure 5:
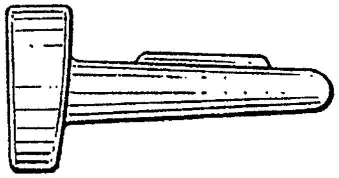
FIG. 5 is a left side view.
Figure 6:
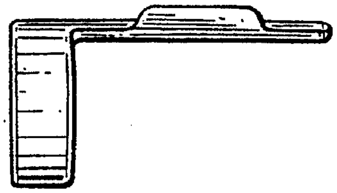
FIG. 6 is a top view.
Figure 7:
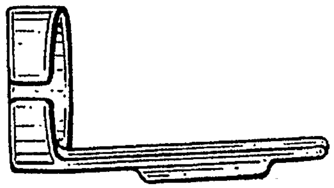
FIG. 7 is a bottom view.

FIG. 8 shows an alternate form of my invention, in which the ring **20*a*** is continuous and does not have a gap for adjustment of its circumference.

The preferred embodiment of my invention has been illustrated in considerable detail in order to comply with the requirements of the patent laws. However, the scope of the invention is to be determined only in accordance with the appended claims.

What I claim is:

1. A slide for use by the player of a stringed musical instrument for temporarily depressing a plurality of strings and thus modifying their vibration frequency, comprising:

a finger ring adapted to be received on one of the player's fingers;

a rigid rail having one end fixedly attached to one part of the circumference of said ring and extending therefrom in a direction substantially perpendicular to the plane of said ring, said rail having one longitudinal edge that is straight; and a finger tab projecting from the other longitudinal edge of said rail so that the player may utilize an adjacent finger to selectively rotate the position of said ring on the one finger and thereby engage said straight edge of said rail with the strings, or disengage said rail from the strings;

said ring, said rail, and said tab being integrally formed.

2. A slide as in claim 1 wherein said ring is not continuous, but has a circumferential gap therein, and is made of a malleable material so that the player may adjust the width of said gap in order to adjust the circumference of the ring.

3. A slide as in claim 1 wherein said ring is continuous throughout its circumference.

4. A slide for use by the player of a stringed musical instrument for temporarily depressing a plurality of strings and thus modifying their vibration frequency, comprising:

a finger ring adapted to be received on one of the player's fingers;

a rigid rail having one end fixedly attached to one part of the circumference of said ring and extending therefrom in a direction substantially perpendicular to the plane of said ring, said rail having one longitudinal edge that is straight; and a finger tab projecting from said rail so that the player may utilize an adjacent finger to selectively rotate the position of said ring on the one finger and thereby engage said straight edge of said rail with the strings, or disengage said rail from the strings;

said ring, said rail, and said tab being integrally formed of a malleable material.

5. A slide as in claim 4 wherein said finger tab projects outwardly in a direction away from said ring.

6. A slide for use by the player of a stringed musical instrument for temporarily depressing a plurality of strings and thus modifying their vibration frequency, comprising:

a finger ring adapted to be received on one of the player's fingers, said ring having a circumferential gap therein and being made of a malleable material so that the player may adjust the width of said gap in order to adjust the circumference of the ring;

a rigid rail having one end fixedly attached to one part of the circumference of said ring and extending therefrom in a direction substantially perpendicular to the plane of said ring, the other end of said rail being rounded; and a finger tab projecting outwardly from said rail in a direction away from said ring so that the player may utilize an adjacent finger to selectively rotate the position of said ring on the one finger and thereby engage said rail with the strings or disengage said rail from the strings;

wherein said ring, said rail, and said tab are integrally formed of a malleable material.

* * * * *